United States Patent
Hao Wooi et al.

(10) Patent No.: US 12,055,643 B2
(45) Date of Patent: Aug. 6, 2024

(54) METHOD FOR REAL-TIME POSITION ESTIMATE CORRECTION OF A MOVABLE OBJECT

(71) Applicant: GRABTAXI HOLDINGS PTE. LTD., Singapore (SG)

(72) Inventors: Simon Lim Hao Wooi, Singapore (SG); Minbo Qiu, Beijing (CN); Xiaocheng Huang, Singapore (SG); Zhengmin Xu, Singapore (SG); Guanfeng Wang, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 18/462,886

(22) Filed: Sep. 7, 2023

(65) Prior Publication Data

US 2023/0417931 A1 Dec. 28, 2023

Related U.S. Application Data

(63) Continuation of application No. 18/009,117, filed as application No. PCT/SG2021/050207 on Apr. 13, 2021, now Pat. No. 11,802,977.

(30) Foreign Application Priority Data

Jun. 8, 2020 (SG) .......................... 10202005410U

(51) Int. Cl.
*G06N 7/01* (2023.01)
*G01C 21/00* (2006.01)
(Continued)

(52) U.S. Cl.
CPC .......... *G01S 19/40* (2013.01); *G01C 21/3837* (2020.08); *G01S 19/396* (2019.08); *G06N 7/01* (2023.01)

(58) Field of Classification Search
CPC ... G01S 19/40; G01S 19/396; G01C 21/3837; G06N 7/01
See application file for complete search history.

(56) References Cited

U.S. PATENT DOCUMENTS 8,718,932 B1 5/2014 Pack et al.
9,482,539 B2 11/2016 Newson et al.
(Continued)

FOREIGN PATENT DOCUMENTS

CN 111177285 A 5/2020
WO 2016068807 A1 5/2016

OTHER PUBLICATIONS

International Search Report and Written Opinion dated Jun. 21, 2021 which was issued in connection with PCT/SG2021/050207.
(Continued)

*Primary Examiner* — Mathew Franklin Gordon
(74) *Attorney, Agent, or Firm* — Buckley, Maschoff & Talwalkar LLC

(57) ABSTRACT

Aspects concern a method for correcting position estimates of a movable object. According to various embodiments, the method comprises establishing (1001) a hidden Markov model HMM, instance for a movable object and, for positioning times of a sequence of positioning times, receiving (1002) a position estimate from a positioning device of the movable object for a respective positioning time, determining (1003) a set of candidate path segments for the positioning time, determining (1004) likelihoods for the candidate path segments to correspond to the position estimate by application of the Viterbi algorithm to the HMM instance, expanding (1005) the HMM instance by the determined likelihoods for the candidate path segments for the positioning time and determining (1006) a corrected position esti-
(Continued)

mate from a candidate path segment of the set of candidate path segments with the highest likelihood.

23 Claims, 11 Drawing Sheets

(51) Int. Cl.
*G01S 19/39* (2010.01)
*G01S 19/40* (2010.01)

(56) References Cited

U.S. PATENT DOCUMENTS

| | | |
|---|---|---|
| 10,415,984 B2 | 7/2019 | Cai et al. |
| 10,533,862 B1 | 1/2020 | Paranjpe et al. |
| 2017/0314938 A1 | 11/2017 | Wang et al. |
| 2018/0335307 A1 | 11/2018 | Chen et al. |

OTHER PUBLICATIONS

International Preliminary Report for Application No. PCT/SG2021/050207, mailed Sep. 20, 2022 (15 pages).
Information Disclosure Statement dated Mar. 31, 2023 which was filed in connection with U.S. Appl. No. 18/009,117.
Song et al., "Press: A Novel Framework of Trajectory Compression in Road Networks", pp. 661-672.
Newson et al., "Hidden Markov Map Matching Through Noise and Sparseness", Microsoft Research, pp. 336-343.
Algizawy et al., "Real-Time Large-Scale Map Matching Using Mobile Phone Data", ACM Transactions on Knowledge Discovery from Data, vol. 11, No. 4, Article 52, Publication date: Jul. 2017, nn. 52:1-52:38.
Aly et al., "semMatch: Road Semantics-based Accurate Map Matching for Challenging Positioning Data", Oct. 13, 2015, (11 pages).
Lou et al., "Map-Matching for Low-Sampling-Rate GPS Trajectories", Microsoft Research Asia (10 pages).
Goh et al., "Online map-matching based on Hidden Markov model for real-time traffic sensing annlications", MIT Onen Access Articles, (7 pages).
Julier et al., "A New Extension of the Kalman Filter to Nonlinear Systems", (12 pages).
Sawlani, "Explaining the Performance of Bidirectional Dijkstra and A+ on Road Networks", A Thesis Presented to the Faculty of the Daniel Felix Ritchie School of Engineering and Computer Science, University of Denver, Jun. 2017, (12 pages).
Luo et al., "Enhanced Map-Matching Algorithm with a Hidden Markov Model for Mobile Phone Positioning", International Journal of Geo-Information, MDPI, ISPR Int. J. Geo-Inf, 2017, No. 6, 327, nn. 1-17.
"Encoded Polyline Algorithm Format", Google Maps Platform, Google Developers, pp. 1-2.
Szwed et al., "An Incremental Map-Matching Algorithm Based on Hidden Markov Model", Conference Paper, Jun. 22, 2014, AGH University of Science and Technology, pp. 1-14.
Mohamed et al., "Accurate Real-time Map Matching for Challenging Environments", IEEE Transactions on Intelligent Transportation Systems, vol. 18, No. 4, Apr. 2017, nn. 847-857.
Guttman, "R-Trees A Dynamic Index Structure For Spatial Searching", 1984, ACM, pp. 47-57.
Notice of Allowance received in connection with U.S. Appl. No. 18/009,117.

METHOD FOR REAL-TIME POSITION ESTIMATE CORRECTION OF A MOVABLE OBJECT

The present invention is non-provisional continuation claiming priority to non-provisional application U.S. Ser. No. 18/009,117 which was filed on Dec. 8, 2022, and is entitled: "METHOD FOR REAL-TIME POSITION ESTIMATE CORRECTION OF A MOVABLE OBJECT" which is a 371 of International Application No. PCT/SG2021/050207, filed on Apr. 13, 2021, of which claims priority from Singapore Paten Application No. 10202005410U filed on Jun. 8, 2020, incorporated by reference herein in its entirety.

TECHNICAL FIELD

Various aspects of this disclosure relate to methods for correcting position estimates of a movable object.

BACKGROUND

In the last years, location-based applications have become increasingly popular. This includes in particular applications for navigation of vehicles and may be provided by built-in navigation devices (i.e. onboard computers) as well as by smartphones which are placed inside a vehicle and set to vehicle navigation. The correct operation of these kinds of applications depends on the correct estimation of the geographical position of the respective movable object, e.g. the vehicle (or, equivalently, the smartphone placed inside the vehicle). Furthermore, due to the real-time nature of applications such as navigation, it should be possible to determine the geographical position in a timely manner (e.g. to be able to detect quickly which road the vehicle is currently in). The geographical position of a movable object in such scenarios is typically estimated using a satellite navigation system. However, since position estimates established using a satellite navigation system have limited accuracy, approaches for correcting position estimates of a movable object that provide high accuracy and are applicable in real-time are desirable.

SUMMARY

Various embodiments concern a method for correcting position estimates of a movable object.

According to various embodiments, the method includes establishing a hidden Markov model instance for a movable object and, for positioning times of a sequence of positioning times, receiving a position estimate from a positioning device of the movable object for a respective positioning time, determining a set of candidate path segments for the positioning time, determining likelihoods for the candidate path segments to correspond to the position estimate by application of the Viterbi algorithm to the HMM instance, expanding the HMM instance by the determined likelihoods for the candidate path segments for the positioning time and determining a corrected position estimate from a candidate path segment of the set of candidate path segments with the highest likelihood.

According to one embodiment, the method further includes transmitting the corrected position estimate to the positioning device. According to one embodiment, the method further includes transmitting the corrected position estimate to the observer device.

According to one embodiment, expanding the HMM instance includes adding the positioning time with the set of candidate path segments as possible values for the positioning time to the HMM and associating the candidate path segments with the determined likelihoods.

According to one embodiment, the application of the Viterbi algorithm to the hidden Markov model (HMM) instance includes an incremental application of the Viterbi algorithm from the positioning time in the sequence of positioning times preceding the positioning time to the positioning time (i.e. from the preceding positioning time to the current positioning time).

According to one embodiment, the application of the Viterbi algorithm to the HMM instance includes determining, for each candidate path segments of the set of candidate path segments, an emission probability that the candidate path segment produces the position estimate, determining transition probabilities between candidate path segments of the last positioning time added to the HMM instance and the candidate path segments of the positioning time and determining the likelihoods from the emission probabilities, the transition probabilities and the likelihoods of the candidate path segments of the last positioning time added to the HMM instance according to the Viterbi algorithm.

According to one embodiment, the method includes retrieving the hidden Markov model (HMM) instance for the movable object from a database and storing the expanded HMM instance in the database.

According to one embodiment, the method includes receiving, for each positioning time of the sequence of positioning times, a position estimate, checking, in response to the reception of the position estimate, whether the position estimate fulfills a predetermined quality criterion and, if the position estimate does not fulfill the predetermined quality criterion, filtering out the position estimate.

According to one embodiment, filtering out the position estimate includes omitting to perform the Viterbi algorithm for the positioning time and omitting to add the positioning time of the position estimate to the hidden Markov model instance.

According to one embodiment, the method includes providing the received position estimate as a corrected position estimate for a positioning time if the determination of a corrected position estimate using the Viterbi algorithm takes longer than a predetermined threshold.

According to one embodiment, determining the corrected position estimate from the candidate path segment includes setting the corrected position estimate to a reference position predefined for the candidate path segment.

According to one embodiment, the movable object is a vehicle.

According to one embodiment, the position estimates are satellite navigation positioning system position estimates.

According to one embodiment, the method includes receiving position estimates for multiple movable objects, maintaining a hidden Markov model instance for each movable object, and determining corrected position estimates for each movable object.

According to one embodiment, the method includes trimming the HMM by removing states with the oldest positioning times if the length of the HMM has exceeded a predetermined maximum length.

According to one embodiment, the method includes providing the corrected position estimate in real-time in response to the reception of the position estimate.

According to various embodiments, a server computer including a radio interface, a memory interface, and a processing unit is provided which is configured to perform the method for correcting position estimates of a movable object.

According to further embodiments, a computer program element and a computer-readable medium are provided which include program instructions, which, when executed by one or more processors, cause the one or more processors to perform the method for correcting position estimates of a movable object.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the devices or methods are analogously valid for the other enclosure devices or methods. Similarly, embodiments described in the context of a device are analogously valid for a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

Typically, real-time positioning of movable objects, such as vehicles or pedestrians moving in the real-world is achieved with the use of internet-connected computing devices that are equipped with a GPS (Global Positioning System) receiver.

Figure 1:
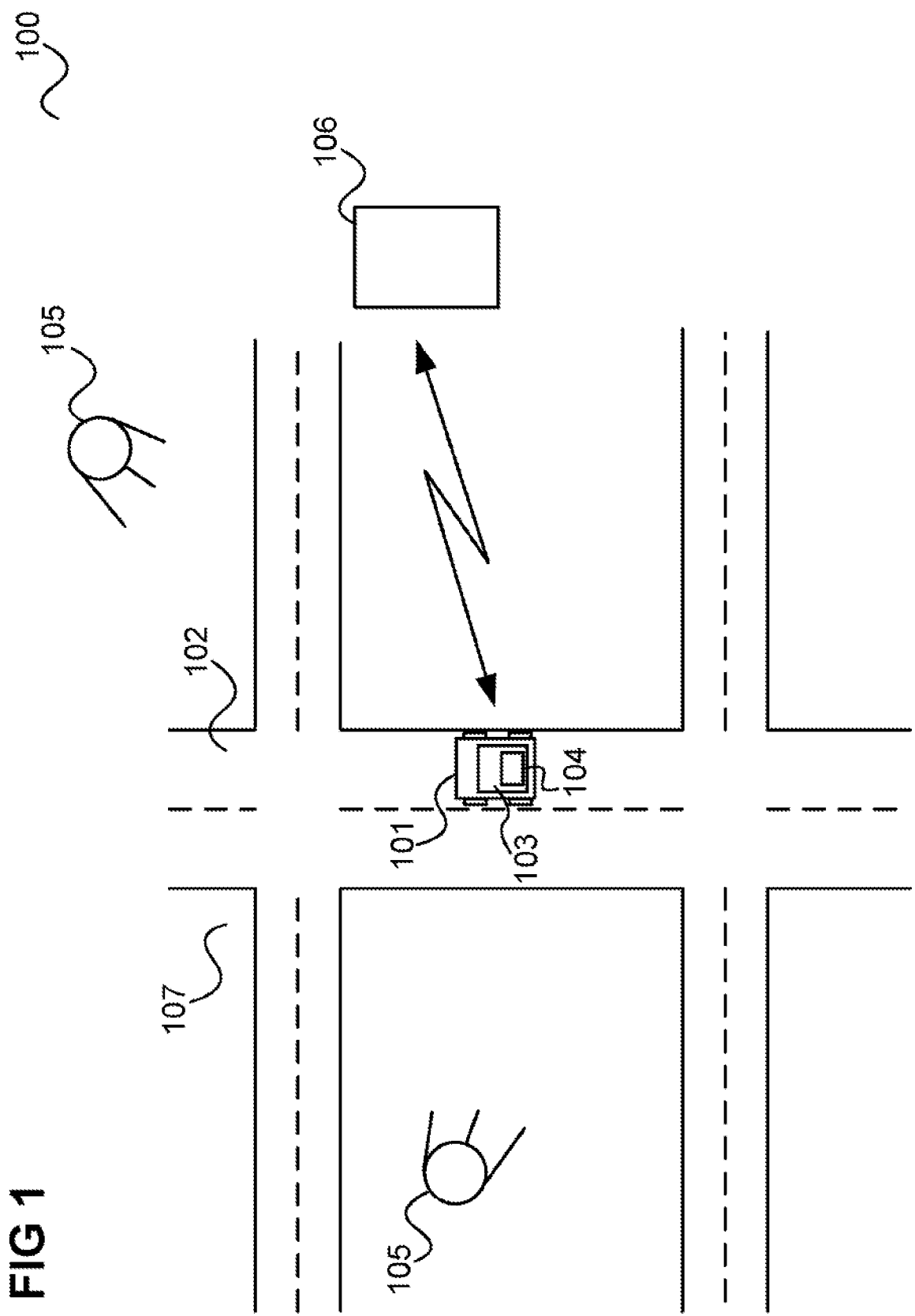
FIG. 1 shows a positioning scenario.

FIG. 1 shows a positioning scenario 100.

A vehicle 101 is moving along a road 102 of a road network 107. The vehicle 101 includes a computing device 103 (e.g. an on-board computer) which includes a GPS receiver 104 receiving positioning signals from satellites 105. The computing device 103 is connected to a server computer 106 via a radio connection (e.g. via a cellular mobile radio communication system) and for example the Internet.

The computing device 103 continuously (e.g. every 30 seconds or every 60 seconds) acquires estimates of its geographical position using GPS and sends it to the server for storage and analysis. The computing device 103 can thus be seen as positioning device. Each position estimate contains a latitude and a longitude and allows the pinpointing of the object (GPS receiver 101 in this example) anywhere on the globe with, in case of GPS, a best-case scenario error of 3 meters.

However, due to the presence of high buildings in an urban environment, the accuracy of such positions may considerably decrease—this is because for the positioning using GPS to work most effectively, line-of-sight to at least four satellites 105 is required. Secondly, in cases of tunnels or thick forests where there are no line-of-sight to any satellite 105, the positioning based on GPS completely breaks down.

Therefore, a processing unit, referred to as positioning enhancement unit in the following, which may be the computing device 103 or the server 106, which then provides positioning results back to the computing device 103, or both of them in collaboration, may process the estimates to provide better positioning of the vehicle 101 (or similarly any other movable object, e.g. a pedestrian's smartphone, a train, etc.)

For example, for real-time positioning of vehicle 101, the positioning enhancement unit 103, 106 may utilize knowledge of the topology of the road network 107 (which may, in general, be a path network, represented by a directed graph). Typically, such topology information is readily available in most urban, as well as rural cities around the world. By further assuming that the object 101 moves on areas with map coverage while obeying basic traffic rules such as speed limits, the direction of the road 102 and the topology of the road 102, the positioning enhancement unit 103, 106 may perform correction of the position estimate (raw OPS coordinate) by map matching (i.e. snapping the estimates to the roads of the road network, e.g. by associating the position with a most likely road segment) as it is illustrated in FIG. 2.

Figure 2:
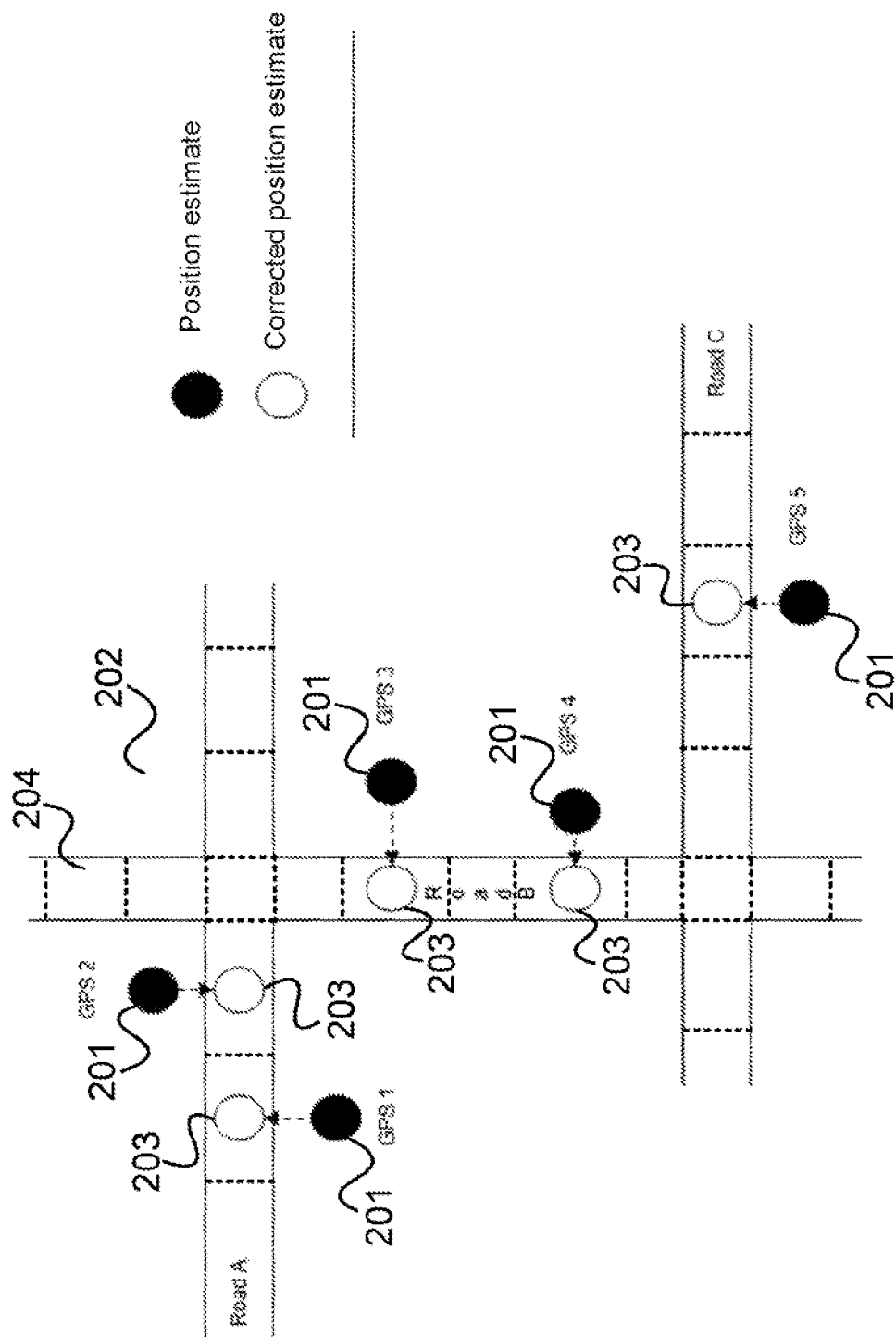
FIG. 2 illustrates snapping of GPS (Global Positioning System) measurements to a road network.

FIG. 2 illustrates snapping of position estimate 201 to a road network 202, e.g. corresponding to road network 107 of FIG. 1.

The positioning enhancement unit 103, 106 corrects each position estimate 201 to a corrected position estimate 203 by moving it to the road network 202. For example, the roads of the road network are subdivided into road segments 204 (delimited by dashed lines in FIG. 2) and a position estimate 201 is snapped to the center of the nearest road segment 204. In general, the road segments may be path segments (e.g. of tracks, bicycle paths, hiking paths, etc.)

For the map matching, the positioning enhancement unit 103, 106, for example, uses a hidden Markov model (HMM). However, for such an approach to work best, the entire temporal sequence of position estimates (raw GPS coordinates) of a journey needs to be acquired first and used as input to the HMM. This is fine for offline analysis or visualization of a movable object's trajectories after the fact, but inadequate if the object's position needs to be known at any given time, i.e. correction of position estimate 201 should be provided in real-time while the vehicle is moving from position to position.

Therefore, according to various embodiments, an approach is provided which allows the positioning of movable objects using a hidden Markov model (HMM) in real-time. Specifically, a system is described in the following that scales the aforementioned HMM to movable objects in real-time.

This means that according to various embodiments, a system (e.g. implemented by the server computer 106) is provided that delivers near real-time positioning of movable objects (e.g. a vehicle, a bicycle, a pedestrian) that are individually tracked in the real-world. The system is capable of continuously receiving position estimates 201 (raw GPS coordinates) and other related metadata from any computing device (e.g. computing device 103 of movable object 101) with access to the Internet. For each object, as it is moving in the real world, the system returns the corrected position, by first determining the object's most likely trajectory on the road network (e.g. road network 107), and returning corrected position estimates 203 that have been projected to the closest position on its most likely road segment respectively.

The object's historical trajectory and previous map matching results (i.e. corrected position estimates 203) are stored on a persistent storage system. Due to the fact that the size of the map matching results may become very large, round-trip network transfer of such data may be prohibitive in terms of latency. To mitigate this, according to various embodiments, a serialization structure is provided with the intent to minimize the storage size required. This may be combined with compression (e.g. a zip program) as the final step.

At map matching in real-time, the system uses an implementation of an HMM. Each position estimate 201 is encoded in the HMM as observation (or, in other words, as an observable state) while the true road segment is encoded as part of (i.e. is given by) a hidden state. The system applies the Viterbi algorithm to find the most likely sequence of road segments for a sequence of observations (i.e. a sequence of position estimate or pre-processed position estimates). The final sequence of road segments, with one to one correspondence to the position estimates, is then projected to the road segment (e.g. to the closest position to the object 101 at the respective time of measurement) and the result of projection is output as the final result of the positioning (and in particular the snap service). In the event that the system fails to perform successful map matching it may return the original position estimate (e.g. raw GPS coordinate. Due to strict timing constraints, if any part of the map matching process takes too much time, the system may treat this as a failure and return the original position estimate.

According to an embodiment, since GPS signals are prone to noise and not entirely trustworthy, the system includes a filtering component which filters out position estimates (e.g. raw GS coordinates) depending on some filtering criteria, before applying the HMM. This means that position estimates 201 may correspond to those position estimates which remain after filtering.

Further, given a position estimate at time t=T, it is may not be feasible to apply an HMM from an initial time t=0 to t=T since this may include too many time steps. It should be noted that the HMM has the property is that the result at time t=T is solely dependent on the result at time t=T−1. Therefore, according to an embodiment, an HMM is applied incrementally where the result of the HMM at each time step (i.e. the snapping result for each measurement time) is kept and reused later to avoid duplication of computation and improve the accuracy of results overall.

According to an embodiment, the system processes multiple objects in parallel i.e. performs positioning for multiple objects using parallelism. Further, according to an embodiment, the system is scalable in that it scales out and scales in (e.g. adapts the number of parallel positioning processes or computational nodes) when the number of objects changes in real-time. The storage (i.e. for storing historical, i.e. previous, HMM states) may be separated from the computation unit (which calculates current HMM state) so the computation unit (and each of the computation nodes, with each perform positioning for one object) is stateless.

Figure 3:
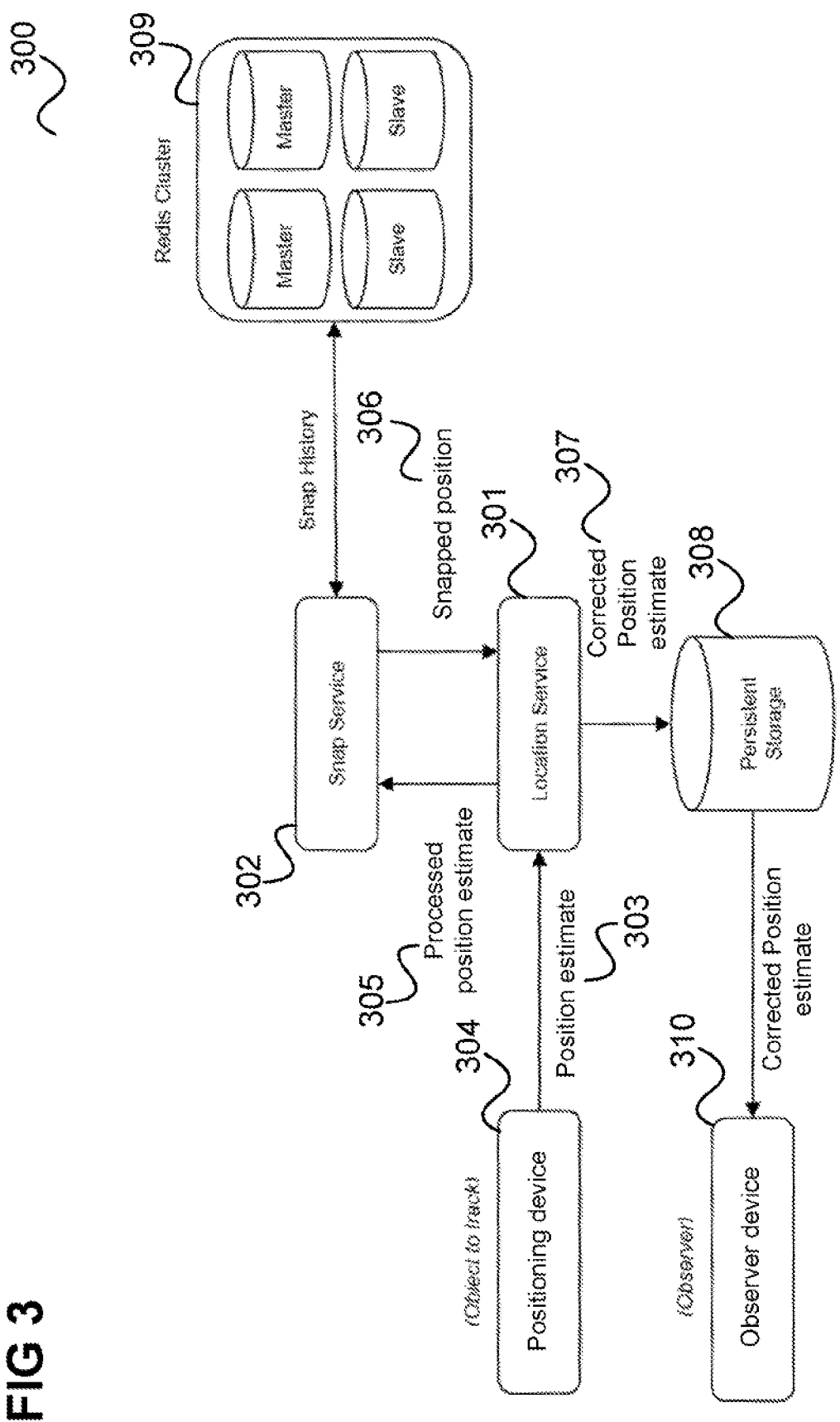
FIG. 3 shows an architecture of a system for correcting position estimates according to an embodiment.

FIG. 3 shows an architecture of a system 300 for correcting position estimates according to an embodiment.

The system 300 may implement a positioning enhancement unit as mentioned above.

The system 300 provides computation units 301, 302 for a location service and for a snap service. The location service computation unit 301 receives position estimates 303 from a positioning device 304 (e.g. corresponding to computing device 103) of an object (e.g. vehicle 101) periodically and applies a filtering logic to remove undesirable and/or noisy positions that would have been otherwise difficult or impossible to perform map matching on.

The snap service computation unit 302 receives the positions remaining after filtering 305 from the location service computation unit 301 to perform map matching. It returns snapped positions 306 which are stored as corrected position estimates 307 in a persistence storage 308 for consumption by other systems for various purposes such as but not limited to routing, debugging and etc. In particular, they may be provided back to the same or an observer device 310, which could may be another computing device (i.e. smartphone) that allows visualization of the movable object's trajectory like for example in an e-hailing application where passengers could see where the driver is now at.

The system 300 further includes a database 309 (e.g. implemented by a Redis cluster) which the snap service computation unit 302 uses to provide an object's previous snap results to enable online map matching.

In a typical scenario, a movable object utilizes a positioning device 304 that is capable of communicating with the system via some form of communication network such as the Internet. Such a positioning device 304 has the capability of communicating with the GPS receiver (e.g. GPS receiver 104) to acquire the current estimated coordinate of the positioning device 304 with a latitude and longitude, along with a measure of how accurate the estimation for the position is. The positioning device 304 sends such information, for example along with the speed of the movable object, and a current timestamp to the location service computation unit 301 for further processing.

Figure 4:
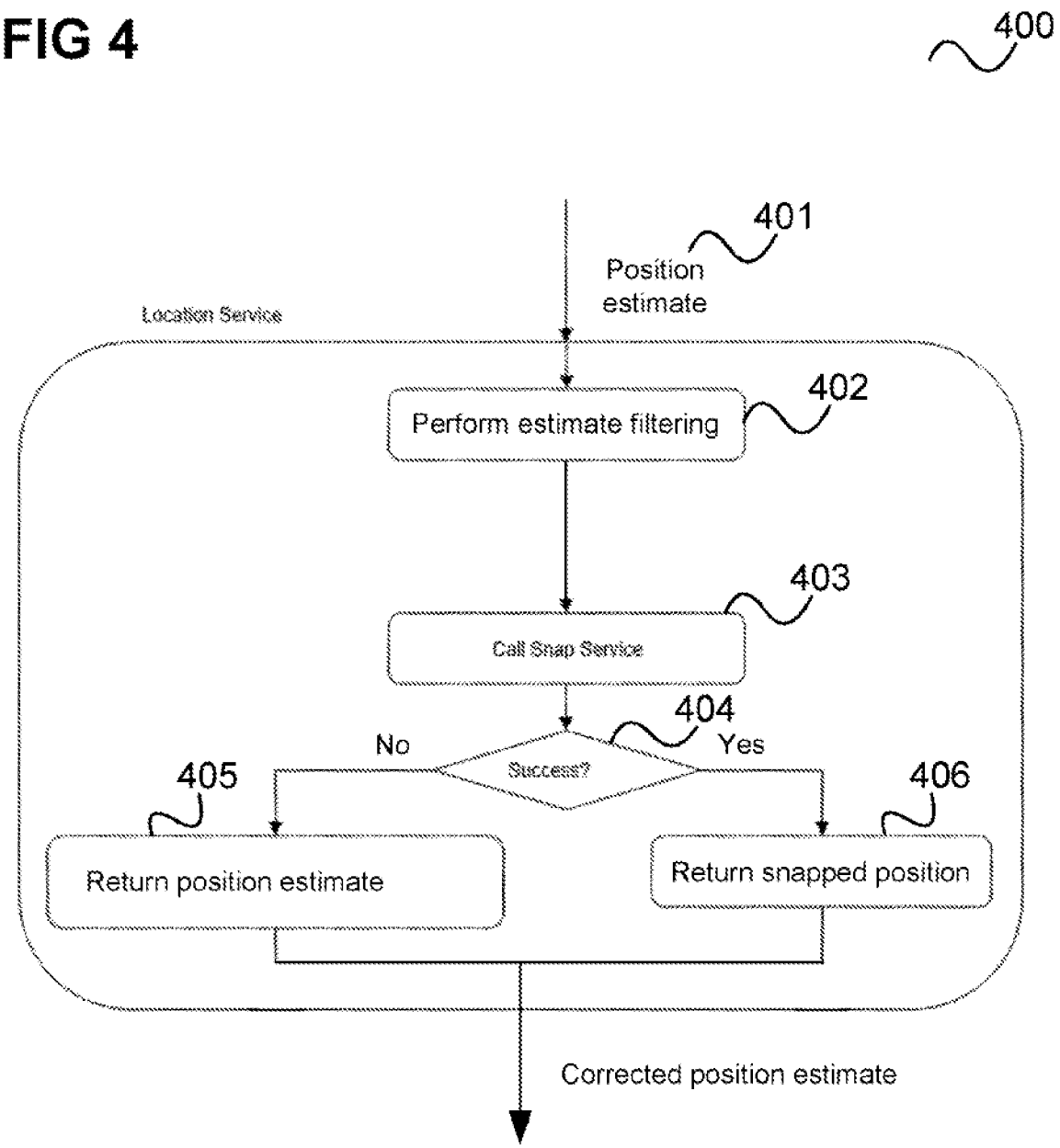
FIG. 4 shows a flow diagram illustrating the processing of position estimates by the location service computation unit of the system of FIG. 3.

FIG. 4 shows a flow diagram 40W illustrating the processing of position estimates 401 by the location service computation unit 301.

In 402, the location service computation unit 301 filters position estimates before providing them to the snap service computation unit 302 for map matching. To determine whether a position should be filtered out (i.e. removed), the location service computation unit 301 may for example use a list of learned heuristics as filter criteria as follows:

1. Each position estimate with GPS accuracy exceeding 128 meters is filtered out;
2. Each position estimate with timestamp of less than 5 seconds as compared to the previous position estimate is filtered out;
3. Each position estimate which is less than 2.5 meters away to the previous position estimate is filtered out; and/or
4. Each position estimate which too far away from the previous position estimate is filtered out.

After the position estimates (raw GPS coordinates) have been filtered, the location service computation unit 301 calls the snap service provided by the snap service computation unit 302 to perform map matching in 403 for each position estimate remaining after filtering. Presumably the map matching process in the snap service computation unit 302 will further improve the accuracy of the position estimate by snapping it on the correct road segment. However, for all intents and purposes, the actual methodology of how the snap service computation unit 302 does map matching is a black box to the location service computation unit 301.

In 404, the location service computation unit 301 checks the result of the snap service. When the snap service computation unit 302 fails to snap successfully (e.g. does not provide a result) or that the snapped position as returned by snap service is too far away from the position estimate (i.e. the snapping result is unlikely to be correct, e.g. when the distance between position estimate and snapped position is more than 100 meters), the location service computation unit 301 outputs the position estimate 303 as the corrected position 307 instead of the snapped position 306 in 405. Otherwise, it outputs the snapped position 406 as the corrected position 307. In practice, the snap service could fail to snap correctly due to flaws in the map matching process or map-related issues.

Figure 5:
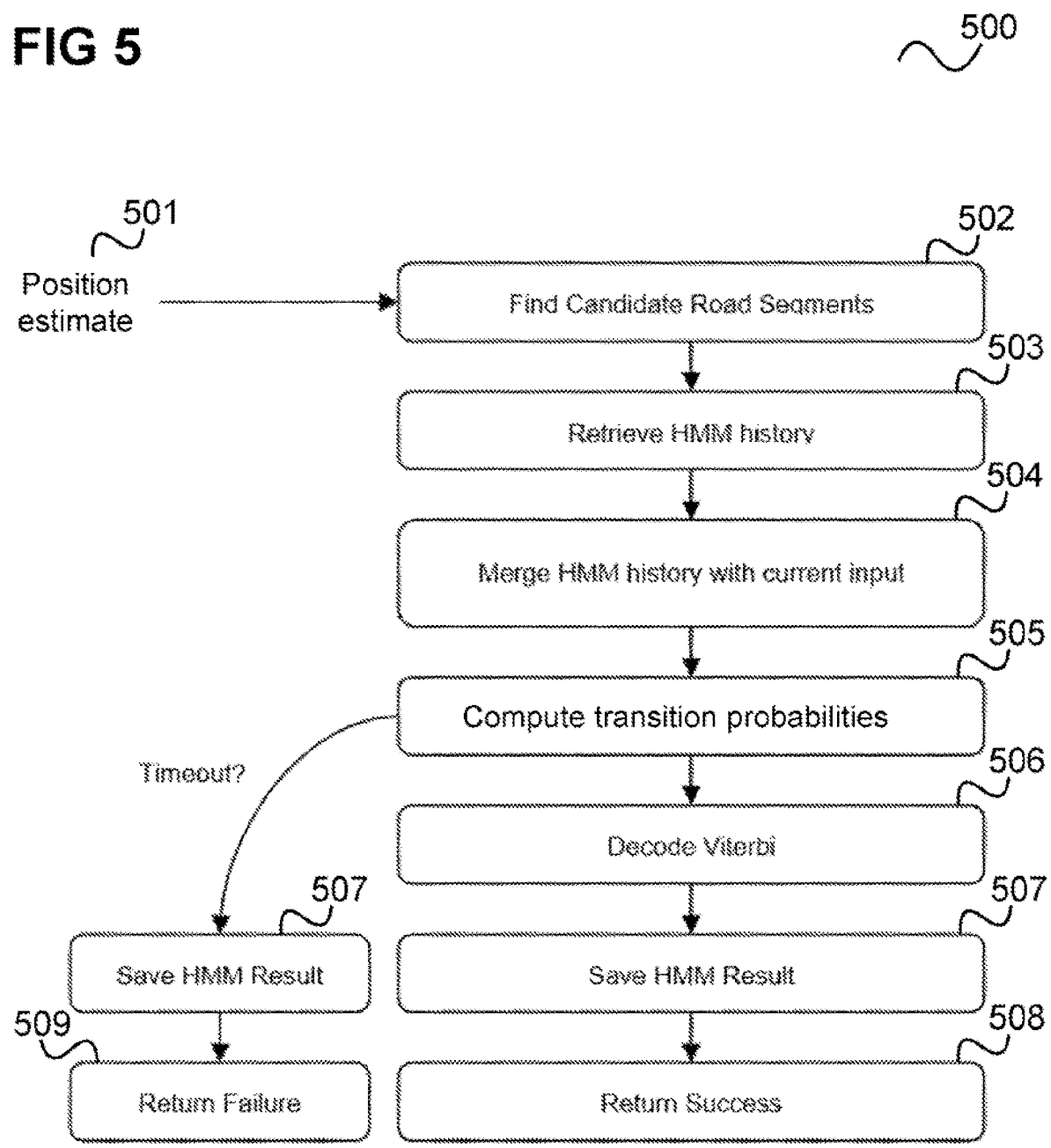
FIG. 5 shows a flow diagram illustrating the processing of a position estimate by the snap service computation unit of the system of FIG. 3.

FIG. 5 shows a flow diagram 500 illustrating the processing of a position estimate 501 by the snap service computation unit 302.

Regarding object identification, for long-term tracking of movable objects, each object 101 is assigned a globally unique identifiable name that the snap service computation unit 302 uses to keep track of each object's historical trajectory, as well as the HMM results at a particular position in time. It uses such information to not only ensure more accurate map matching results but also to enable real-time positioning of the object without doing duplicated work.

While it is possible to perform map matching on a fixed window of e.g. five position estimates (i.e. five positioning times), often it is not feasible to delay processing until five position estimates are accumulated. By the time the position estimates are processed, they would be out-of-date. To make positioning suitable for real-time, according to one embodiment, the snap service computation unit 302 incorporates, for a current position estimate of an object 101, the object's past HMM instance from previous snap results and performs map matching only on the current position estimate. This is denoted as incremental map matching and allows the snap service to process every position estimate as it receives in real-time.

First, in 502, the snap service computation unit 302 finds candidate road segments as a target for the snapping of the position estimate (i.e. raw GPS coordinate). Due to the inherent inaccuracy of raw GPS coordinates (e.g. raw GPS coordinates provided by a GPS receiver), the position estimates have varying degrees of accuracy. i.e. they often do not fall exactly on the road segments that the object is moving on. In practice, however, the actual road segment the movable object (e.g. vehicle) is moving on is often close to the position estimate, if not the nearest road segment. Therefore, before the correct road segment can be determined by map matching, for each position estimate considered, the snap service computation unit 302 retrieves and sorts all nearby road segments by how close they are to the position estimate. To do so, a tree-like data structure called R-Tree may be used to allow efficient retrieval of nearby road segments. Depending on the accuracy level of the position estimate, the snap service computation unit 302 can adjust how big or small the radius of the circle centered on the position estimate will be, wherein the snap service computation unit 302 considers every road segment that lies within the circle to be potentially the actual road segment (i.e. includes those mad segments as candidate mad segments).

The emission probability (also known as measurement probability) of each road segment signifies the likelihood that the position estimate observed (observable state) would be observed if the movable object was actually on the road segment. This arises from the intuition that the further away a road segment is from the position estimate, the less likely for it to have produced the observed position estimate. There are multiple methods of calculating emission probabilities, such as using Gaussian distribution, exponential distribution etc. Here, a Gaussian distribution is used as example, where the emission probability is given by the equation (1).

$$p(z_t|r_i) = \frac{1}{\sqrt{2\pi}\sigma_t} e^{-0.5\left(\frac{\|z_t - x_{t,i}\|}{\sigma_t}\right)^2} \quad (1)$$

The position estimate at time t is denoted as $z_t$, each road segment is denoted as $r_i$, closest position on road segment i for coordinate t is denoted as $x_{t,i}$ and the GPS accuracy for time t is denoted as $\sigma_t$. The parameters $\pi$ and $\sigma$ can be learned and set beforehand.

Once the snap service computation unit 302 has assigned an emission probability to all candidate road segments it calculates the transition probabilities. For this, it retrieves the historical HMM instance in 503, in particular the list of candidate segments for the time (i.e. timestamp) of the last position that has been snapped (i.e. the timestamp of the previous snapping) and merges it with the current position in 504.

Figure 6:
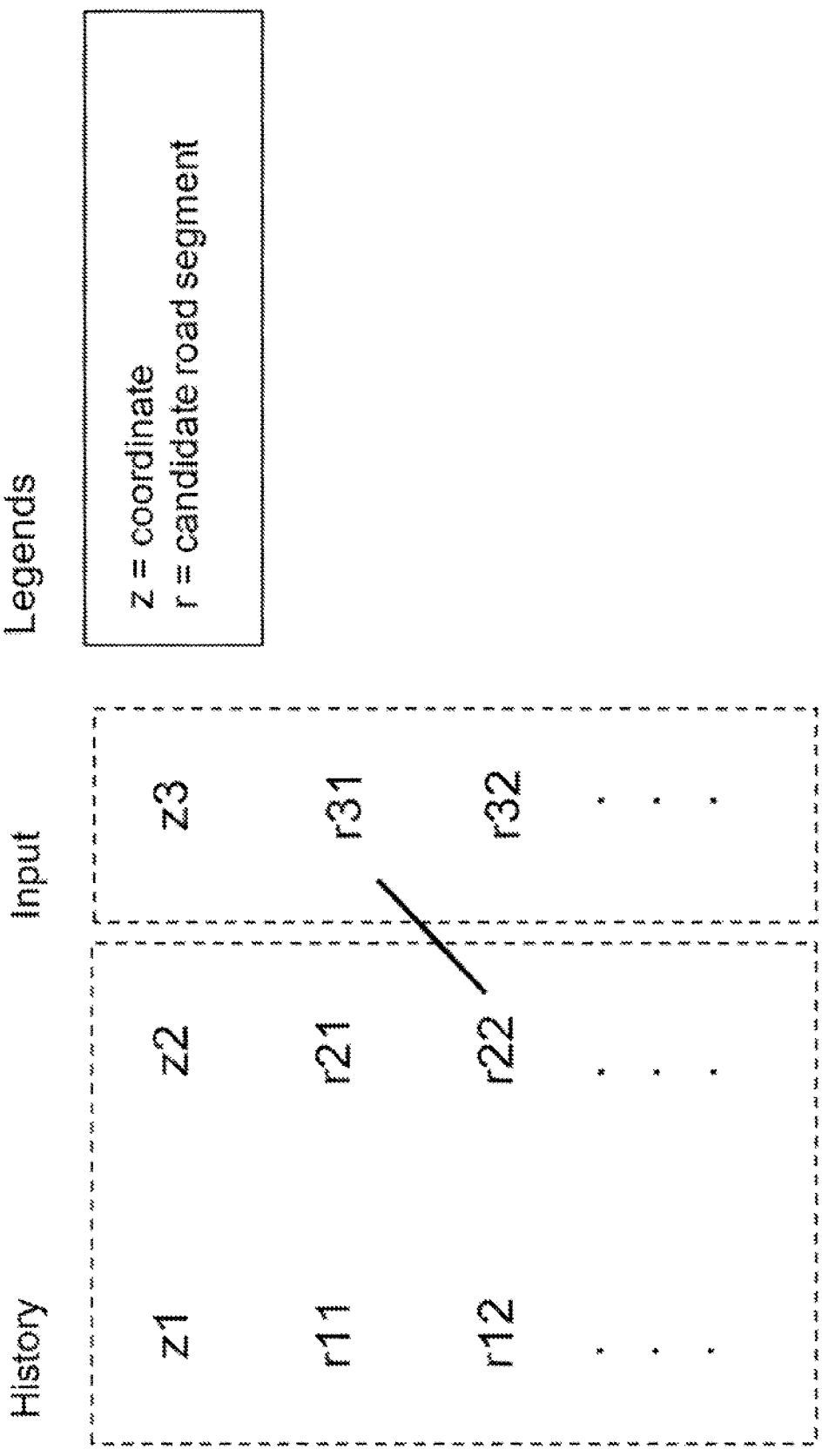
FIG. 6 illustrates a sequence of positions and corresponding lists of road segments.

FIG. 6 illustrates a sequence of positions and corresponding lists of road segments.

For simplicity, there are only two historical positions, denoted as z1 and z2. The current coordinate (with timestamp t) is denoted as z3.

The list of (road segment) candidates for $z_1$ is $\{r_{11} \cdot r_{12}\}$ and the list of candidates for $z_2$ is $\{r_{21}, r_{23}\}$ and the list of candidates for the current position $z_3$ is $\{r_{31} \cdot r_{32}\}$.

As will be described below, according to an embodiment, the snap service computation unit 302 only retrieves the HMM information for the previous position, in particular only the list of candidates for $z_2$.

In 505, the snap service computation unit 302 now calculates the transition probabilities from t−1 to t. That means that it calculates, for each combination of candidate road segment of the previous position and candidate road segment of the current position, the probability that the movable object 101 has moved from the candidate road segment of time t−1 to the candidate road segment of time t.

In the example of FIG. 6, this means that the snap service computation unit 302 calculates the transition probability from $r_{21}$ to $r_{31}$, from $r_{21}$ to $r_{32}$, from $r_{22}$ to $r_{31}$ (indicated by a line as an example) and from $r_{22}$ to $r_{32}$.

It is likely that moving object would traverse the shortest route possible as allowed by the topology of the road network within the speed limit. Therefore, to estimate the transitional probability between two candidate road segments (with index i and index j), according to an embodiment, the snap service computation unit 302 computes the shortest route $D_{i,j}$ between two candidate road segments, e.g. with the bidirectional Dijkstra's algorithm.

It may then use the expression (2) to calculate the transition probability (written logarithmically):

$$-\log \beta - \frac{D_{i,j}}{\beta} \qquad (2)$$

The parameter $\beta$ is a constant for example set to 10 and $D_{i,j}$ is the routing distance from candidate road segment i to candidate road segment j as mentioned above. As the emission probabilities, the transition probabilities may be calculated in various ways and are not limited to the examples given here. The approaches described herein may be used independently from the concrete choice of emission probability and transition probability calculation.

If there are no possible routes between two candidate road segments, or if the routing distance exceeds the distance that the movable object could traverse given the speed limit of the road (e.g. taking into account a certain tolerance), the transition probability between the road segments is set to zero.

Due to the fact that calculation of shortest routing distance is often the most expensive process in terms of computational effort, the snap service computation unit 302 according to an embodiment terminates the calculation early if the total routing distance calculated so far has exceeded a distance threshold. The snap service computation unit 302 sets this distance threshold based on the associated timestamp of the two positions (i.e. the time difference between t and t−1). The intuition behind this is that it is highly unlikely for any object to move too quickly since objects have to obey the speed limits imposed by the road network.

Once the snap service computation unit 302 has calculated the emission and transition probabilities, it performs the Viterbi algorithm in 506.

It should be noted that if the current coordinate is not the first coordinate then for the previous coordinate (since the snapping process has been performed similarly for the previous coordinate), the snap service computation unit 302 knows the likelihoods of the candidate road segments of the previous coordinate (timestamp t−1). By combining these likelihoods (according to the Viterbi algorithm) with the transition probabilities and emission probabilities calculated for the current coordinate (timestamp t) the snap service computation unit 302 calculates a likelihood for each candidate road segment of the current coordinate. It may then select the center of the road segment (or another reference coordinate associated with that road segment) with the highest likelihood as the snapped coordinate and output it to the location service computation unit 301 in 508. If there is not a single candidate road segment with likelihood greater than zero, the snap service computation unit 302 deems that map matching has failed in 509. It may then return the current position estimate as snapping result. This may also happen in case the snapping process taking too long.

If there is no HMM instance for the movable object. i.e. there is no previous coordinate, the snap service computation unit 302 sets up a new HMM instance whose first coordinate is the current coordinate (i.e. whose initial time is the timestamp of the current coordinate). In that case, the snap service computation unit 302 calculates the likelihood for the road segments of the current coordinate based only on the emission probabilities.

If there is prior information about the movable object, i.e. an HMM instance exists, the snap service computation unit 302 can retrieve the HMM instance for the movable object, and can append the results for the current position to the end of the HMM instance (as data for the last position or time of the HMM instance). If the length of the HMM instance (i.e. last position's timestamp minus the first position's timestamp) exceeds a threshold. e.g. two minutes, older positions may be trimmed away. Thus, the total length of the HMM instance will not exceed two minutes, to ensure the HMM instance will not grow infinitely large. According to an embodiment, if a driver is idle for more than a threshold, e.g. 3 minutes, the snap service computation unit 302 deletes the HMM instance.

It should be noted that it is possible to retrieve the complete most likely sequence of road segments that the object has traversed (since the timestamp of the first position of the current HMM instance for the object). To do so, the candidate road segment of the previous position with the highest probability is recursively found until the first position. This means that it is possibly to follow the back pointer to get the full optimal state path and return all the outputs (1 input, N outputs).

However, according to an embodiment, the snap service computation unit 302 returns, given the position estimate of time t, only the corrected position of time t.

To support accurate on-the-fly snapping of a position at a time, as explained above, the snap service computation unit 302 performs incremental map matching on the object's prior information, rather that starting over and constructing a new HMM instance for every position estimate received unless there is currently no HMM instance for the movable object. To achieve that, the snap service computation unit 302 stores the results for the current position estimate as HMM history information in the database 309 in 507 (for later retrieval for the next position in 503). e.g. in the form of an HMM encoding table.

This means that information about the object, as well as computed information as a result of it, is encoded, stored, and later retrieved. Such information, for example, includes the position estimates, the exact (e.g. Unix) timestamps of the positions, all the candidate road segments for all the positions, and finally a representation of the corresponding HMM instance itself. Additionally, all that information is encoded as efficiently as possible to conserve memory and ensures fast database retrieval (e.g. short Redis round-trip-time (RTT)).

According to an embodiment, before the snap service computation unit 302 encodes the candidate road segments, it constructs a candidate encoding table to ensure that candidates that are "duplicated" across position estimates at different timestamps are encoded only once per each unique candidate.

Figure 7:
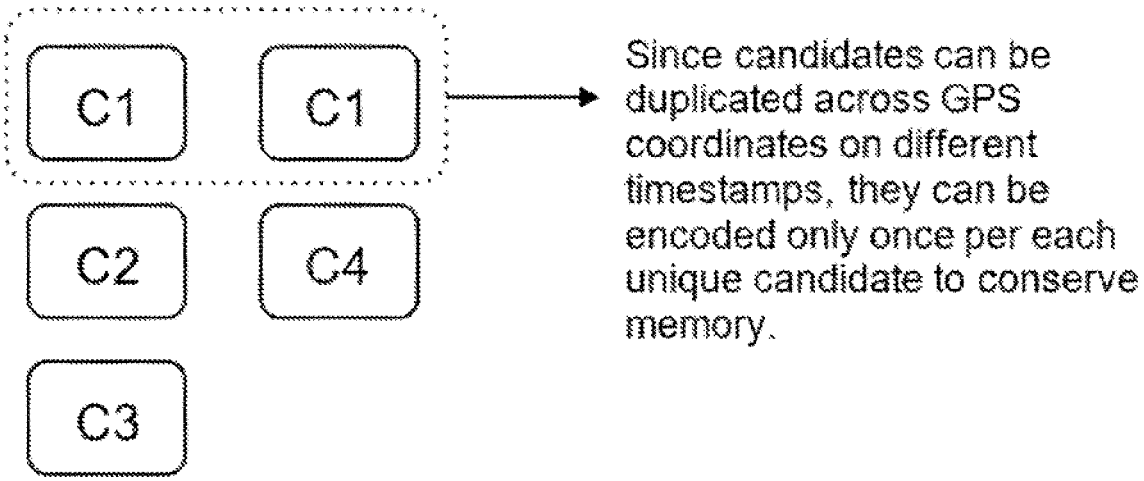
FIG. 7 illustrates generation of a candidate encoding table according to an embodiment.

FIG. 7 illustrates generation of a candidate encoding table 700.

Each candidate C1, C2, C3, C4 represents one particular road segment and it has attributes like mad segment start node ID 701 and road segment end node ID 702 (assuming that mad segments are selected such that each road segment is a straight line). To de-duplicate the candidates (i.e. avoid duplicates of candidates), each candidate may be uniquely given by the road segment start node ID 701 and the road segment end node ID 702.

Once all the information about the candidates are encoded in the candidates encoding table 700, the snap service computation unit 302 constructs the HMM encoding table.

Figure 8:
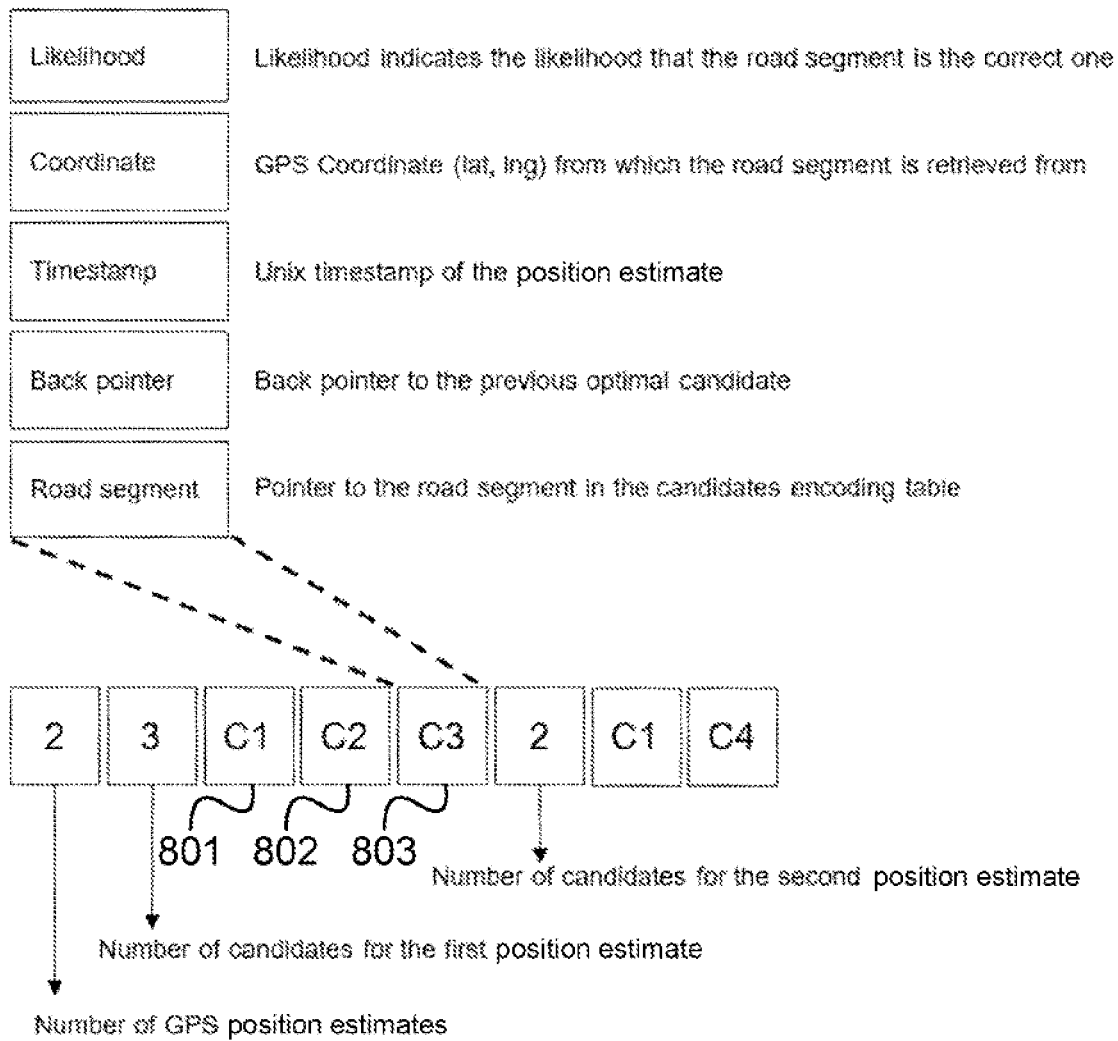
FIG. 8 illustrates generation of a hidden Markov model (HMM) encoding table according to an embodiment.

FIG. 8 illustrates generation of an HMM encoding table 800 according to an embodiment.

The HMM encoding table 800 contains the following information for each road segment candidate 801, 802, 803 for each position (i.e. each positioning time (e.g. corresponding to the coordinate timestamp)):
1. Likelihood of the candidate being correct
2. Position (e.g. center) of road segment
3. Timestamp (suffices once for the set of the mad segments for the coordinate)
4. Optimal state path (e.g. in the form of a back pointer)
5. Candidate road segment ID (e.g. pointer to a particular road segment in the candidates encoding table)

This means that the HMM encoding table 800 contains the likelihood value 804 for every candidate road segment. The likelihood value indicates the maximum Viterbi likelihood value of all the previous sequences up to the candidate on that timestamp. However, because a likelihood is a probability value and a probability value is always a number between 0 and 1 and it will lose precision soon and even underflow, it is stored as a logarithmic probability rather than as a raw probability value directly. Thus, the likelihoods are negative numbers that get progressively smaller (from timestamp to timestamp). To conserve memory, the logarithmic likelihood values are for example stored as Float32.

As the Viterbi probability is an accumulation of emission probability and transition probability and both probabilities have an upper bound (e.g. −6.53 and −12.3 respectively under the parameter set according to an embodiment) an upper bound for Viterbi probability after N points can be calculated. Based on the assumption that the longest time a driver is driving cannot exceed 24 hours and the highest frequency of the provision of position estimates using GPS is two seconds, the upper bound for Viterbi probability is an accumulation of 43.200 points, which turns out to be −813.443.7.

According to an embodiment, the position estimates (raw GPS coordinates) 805, which consists of a pair of latitude and longitude, are downsampled to six decimal points to conserve memory. Position estimates of up to six decimal points are corrected up to 0.11 meters which is more than needed in a typical c-hailing application. Subsequently, the position estimates are for example encoded using the Encoded Polyline Algorithm Format which attempts to encode a sequence of positions as efficiently as possible, by encoding only the "offset" of a position compared to the previous position. In the present case, position estimates represent an object's past trajectory.

The timestamps 806 of the position estimates, which are essentially Unix timestamps, may be stored similarly to the position estimates. The first timestamp of an HMM instance is encoded as-is, and all subsequent timestamps are encoded by encoding the offset to the previous timestamp.

The optimal state path may be encoded as a back pointer 807 to the previous optimal mad segment candidate. It for example consists of two 16-bit unsigned integers, one to indicate the index of the position, the other to indicate the index of the candidate. With this decision, them is a self-imposed limit of 65.536 coordinates in the HMM encoding table.

The candidate road segment 808 is for example encoded as a pointer to the road segment encoded in the candidates encoding table. Therefore, it can be encoded as 16 bits unsigned integer. With this decision, there is a self-imposed limit of 65.536 candidates.

The snap service computation unit 302 may apply a compression algorithm to the bytes representation of the candidates and HMM encoding table (e.g. a zip algorithm. e.g. set to best speed), to further reduce the number of encoded bytes.

As described above, the HMM encoding table 800 contains information on the optimal state path for every candidate in form of back pointers.

Figure 9:
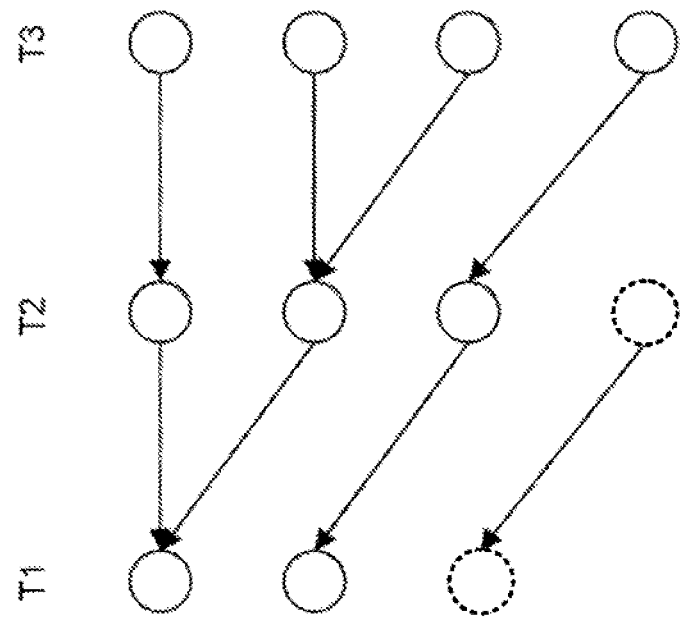
FIG. 9 illustrates back pointers between the road segment candidates for a sequence of (monotonically increasing) timestamps.

FIG. 9 illustrates back pointers 901 between the road segment candidates 902, 903 for a sequence of (monotonically increasing) time stamps T1, T2, T3.

For each candidate, it is possible to follow its chain of back pointers to retrieve its entire optimal state path.

However, there may be orphaned candidates 903 which are defined as candidates which are unreachable from any of the candidates in the latest time step T3. The snap service computation unit 302 may safely omit such orphaned candidates 903 from the HMM encoding table 800 because they are not going to impact the calculation of the next snap request (for a next timestamp T4). The snap service computation unit 302 may perform a backtracking operation to identify orphaned candidates relatively cheap but allows it to achieve a huge reduction in the size of the final size of the HMM encoding table 800. This will in turn help keeping latency low due to shorter tin for retrieval of HMM history information from the database 309 (e.g. Redis round-trip-time (RTT)).

Figure 10:
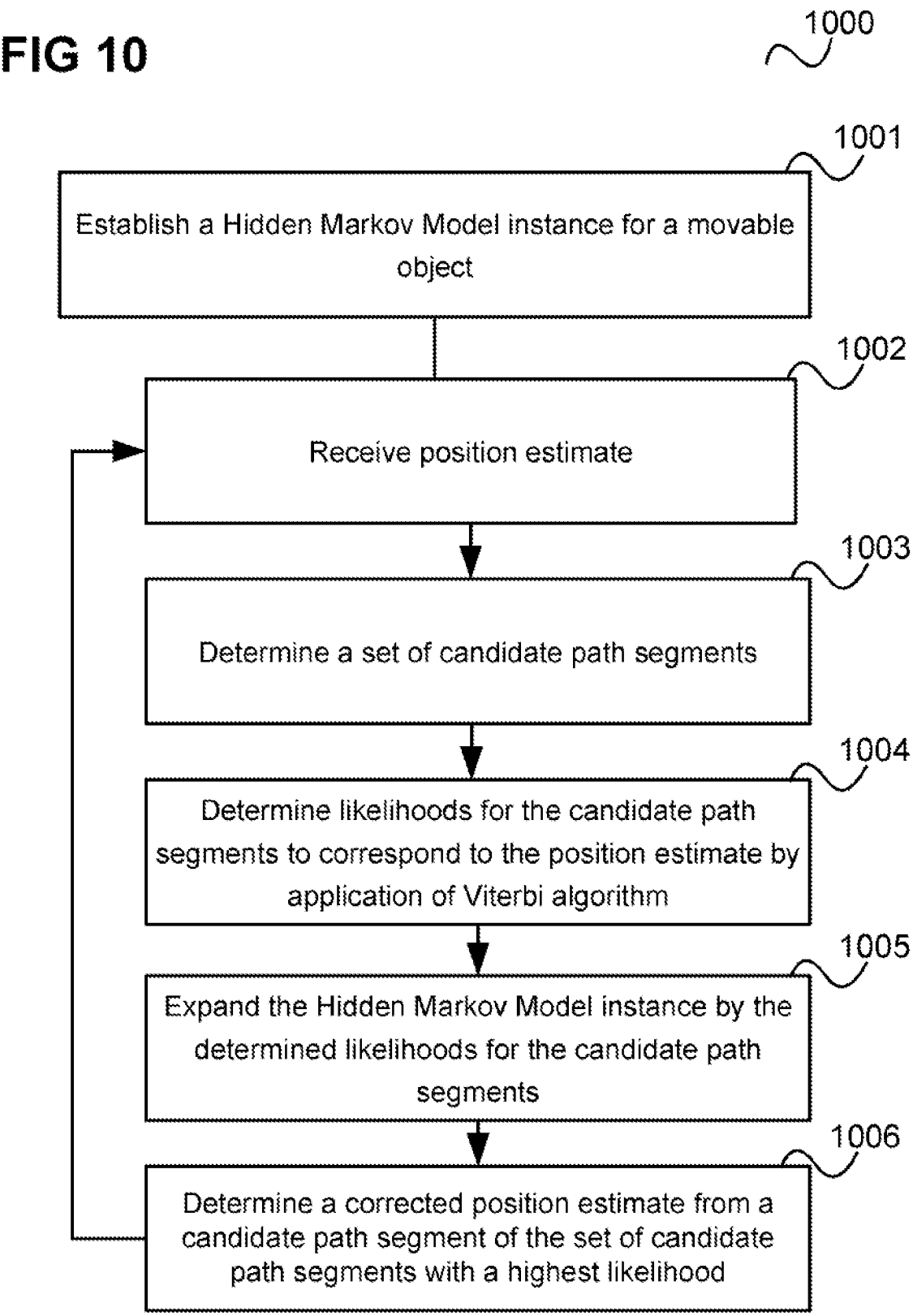
FIG. 10 shows a flow diagram illustrating a method for correcting position estimates of a movable object according to an embodiment.

In summary, according to various embodiments, a method is provided as illustrated in FIG. 10.

FIG. 10 shows a flow diagram 1000 illustrating a method for correcting position estimates of a movable object according to an embodiment.

In 1001, a hidden Markov model (HMM) instance for the movable object (e.g. a vehicle or a device placed or placeable in a vehicle, e.g. a built-in navigation device or a smartphone) is established.

For (each positioning time of) positioning times of a sequence of positioning times:

In 1002, a position estimate is received from a positioning device of the movable object for a respective positioning time.

In 1003, a set of candidate path segments (of a path network, e.g. a road network, on which the movable object is moving) is determined for the positioning time.

In 1004, likelihoods for the candidate path segments to correspond to the position estimate by application of the Viterbi algorithm to the hidden Markov model instance are determined.

In 1005, the HMM instance is expanded by the determined likelihoods for the candidate path segments for the positioning time (i.e. data for a new time point (namely the positioning time) is added to the HMM instance and the determined likelihoods are assigned to the candidate path segments (i.e. the hidden states of the HMM)).

In 1006, a corrected position estimate is determined from a candidate path segment of the set of candidate path segments with the highest likelihood.

The corrected position estimate may then be provided back to the positioning device and/or may also be provided to another device (e.g. a server computer) for further processing or usage in an application such as a navigation or e-hailing application. It may further be used as an input to a controller, in particular of the movable object, e.g. a vehicle controller when the movable object is a vehicle, for example for autonomous driving.

According to various embodiments, in other words, a positioning device successively provides position estimates and a correction service (e.g. provided by a positioning server) corrects the position estimates (as they are received from the positioning device) by applying the Viterbi algorithm incrementally to an HMM. The respective HMM instance may be seen to grow with each received position estimate, although it may be trimmed from time to time (e.g. data for older positioning times may be removed from the HMM instance) and the HMM instance may be deleted in case no position estimate has been received for a certain period of time.

The hidden Markov model instance is for example established in response to a reception of a position estimate from the positioning device of the movable object for the initial (i.e. first) positioning time of the sequence of positioning times. This means that 1001 can be performed in after 1002 for the initial positioning time (but before 1002 for the following positioning times).

It should be noted that receiving a position estimate may include pre-processing such as smoothing, e.g. Kalman smoothing.

Figure 11:
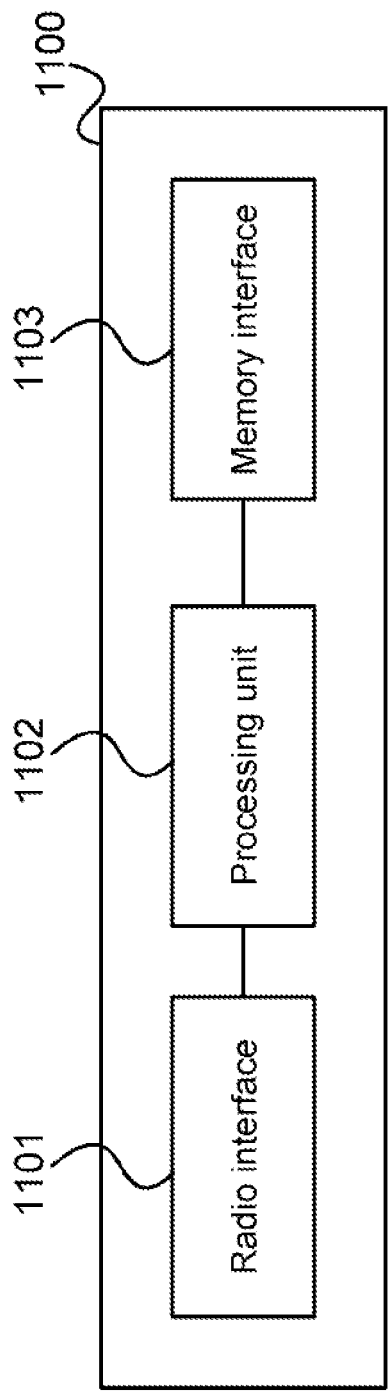
FIG. 11 shows a server computer according to an embodiment.

The method of FIG. 10 is for example carried out by a server computer as illustrated in FIG. 11.

FIG. 11 shows a server computer 1100 according to an embodiment.

The server computer 1100 includes a radio interface 1101 (e.g. configured for radio communication with the positioning device, for example via a mobile radio communication network). The server computer 1100 further includes a processing unit 1102 and a memory interface 1103. The memory interface 1103 allows the processing unit 1102 to access an internal or external memory (at least partially) storing the hidden Markov model instance. The server computer is configured to perform the method of FIG. 10.

The methods described herein may be performed and the various processing or computation units and devices described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor. A "circuit" may also be software being implemented or executed by a processor. e.g. any kind of computer program. e.g. a computer program using a virtual machine code. Any other kind of implementation of the respective functions which am described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for correcting position estimates of a movable object comprising:
receiving a position estimate from a positioning device of the movable object for a respective positioning time;
determining that the position estimate fulfills a predetermined quality criterion;
determining a set of candidate path segments for the positioning time;
determining likelihoods for the candidate path segments to correspond to the position estimate;
determining a corrected position estimate from a candidate path segment of the set of candidate path segments with the highest likelihood;
setting the corrected position estimate to a reference position predefined for the candidate path segment; and
transmitting the corrected position estimate to the positioning device.

2. The method of claim 1, further comprising:
establishing a hidden Markov model (HMM) instance for the movable object.

3. The method of claim 2, wherein determining likelihoods for the candidate path segments to correspond to the position estimate further comprise:
applying a Viterbi algorithm to the HMM instance.

4. The method of claim 3, further comprising:
expanding the HMM instance by the determined likelihoods for the candidate path segments for the positioning time.

5. The method of claim 4, further comprising:
constructing an HMM encoding table to store information of the HMM instance; and
wherein the information of the HMM instance stored in the HMM encoding table includes a back pointer to a previous optimal path segment candidate.

6. The method of claim 4, wherein expanding the HMM instance comprises adding the positioning time with the set of candidate path segments as possible values for the positioning time to the HMM and associating the candidate path segments with the determined likelihoods.

7. The method of claim 3, wherein the application of the Viterbi algorithm to the HMM instance comprises an incremental application of the Viterbi algorithm from the positioning time in a sequence of positioning times preceding the positioning time to the positioning time.

8. The method of claim 3, wherein the application of the Viterbi algorithm to the HMM instance comprises determining, for each candidate path segments of the set of candidate path segments, an emission probability that the candidate path segment produces the position estimate, determining transition probabilities between candidate path segments of a last positioning time added to the HMM instance and the candidate path segments of the positioning time and determining the likelihoods from the emission probabilities, the transition probabilities and the likelihoods of the candidate path segments of the last positioning time added to the HMM instance according to the Viterbi algorithm.

9. The method of claim 5, further comprising:
retrieving a past HMM instance for the movable object from the HMM encoding table and storing the expanded HMM instance in the HMM encoding table.

10. The method of claim 1, further comprising:
receiving, for each positioning time of a sequence of positioning times, a position estimate;
checking, in response to the reception of the position estimate, whether the position estimate fulfills the predetermined quality criterion; and
if the position estimate does not fulfil the predetermined quality criterion, filtering out the position estimate.

11. The method of claim 3, further comprising:
receiving, for each positioning time of a sequence of positioning times, a position estimate;
checking, in response to the reception of the position estimate, whether the position estimate fulfills the predetermined quality criterion; and
if the position estimate does not fulfill the predetermined quality criterion, filtering out the position estimate;
wherein filtering out the position estimate comprises omitting to perform the Viterbi algorithm for the positioning time and omitting to add the positioning time of the position estimate to the hidden Markov model instance.

12. The method of claim 3, further comprising:
providing the received position estimate as corrected position estimate for a positioning time if the determination of a corrected position estimate using the Viterbi algorithm takes longer than a predetermined threshold.

13. The method of claim 1, wherein determining the corrected position estimate from the candidate path segment comprises setting the corrected position estimate to a reference position predefined for the candidate path segment.

14. The method of claim 1, wherein the movable object is a vehicle.

15. The method of claim 1, wherein the position estimate is a satellite navigation positioning system position estimate.

16. The method of claim 3, further comprising:
receiving position estimates for multiple movable objects, maintaining an HMM instance for each unique movable object and determining corrected position estimates for each movable object in parallel.

17. The method of claim 3, comprising trimming the HMM by removing states with oldest positioning times if the length of the HMM has exceeded a predetermined maximum length.

18. The method of claim 1, comprising providing the corrected position estimate in real-time in response to the reception of the position estimate.

19. The method of claim 5, wherein a candidate encoding table is constructed to encode the candidate path segments and wherein the candidate encoding table comprises attributes including a road segment start node ID and a road segment end node ID.

20. The method of claim 1, wherein the information of the HMM instance stored in the HMM encoding table comprises:
a likelihood value for each candidate path segment indicating a likelihood that the respective path segment is the corrected position estimate;
a coordinate value of the position estimate consisting of a pair of latitude and longitude; and
at least one of (i) a timestamp of the position estimate, and (ii) a pointer to the candidate path segments encoded in the candidate encoding table.

21. The method of claim 2, wherein the position estimate is encoded using Encoded Polyline Algorithm Format.

22. The method of claim 2, wherein a first timestamp of the HMM instance is encoded as-is and a subsequent timestamp is encoded by encoding an offset to a previous timestamp.

23. The method of claim 10, wherein the predetermined quality criterion comprises a list of learned heuristics selected from a group of filter criteria consisting of: i) if the position estimate with GPS accuracy exceeds 128 meters, the position estimate is filtered out; ii) if the position estimate has a timestamp of less than 5 seconds subsequent to a previous position estimate, the position estimate is filtered out; iii) if the position estimate is less than 2.5 meters away to a previous position estimate, the position estimate is filtered out; iv) if a distance between the position estimate and a previous position estimate exceeds a distance threshold, the position estimate is filtered out.

* * * * *